Dec. 4, 1928.
J. J. KOELBEL
1,694,344
LOADER
Filed Feb. 24, 1928  3 Sheets-Sheet 1
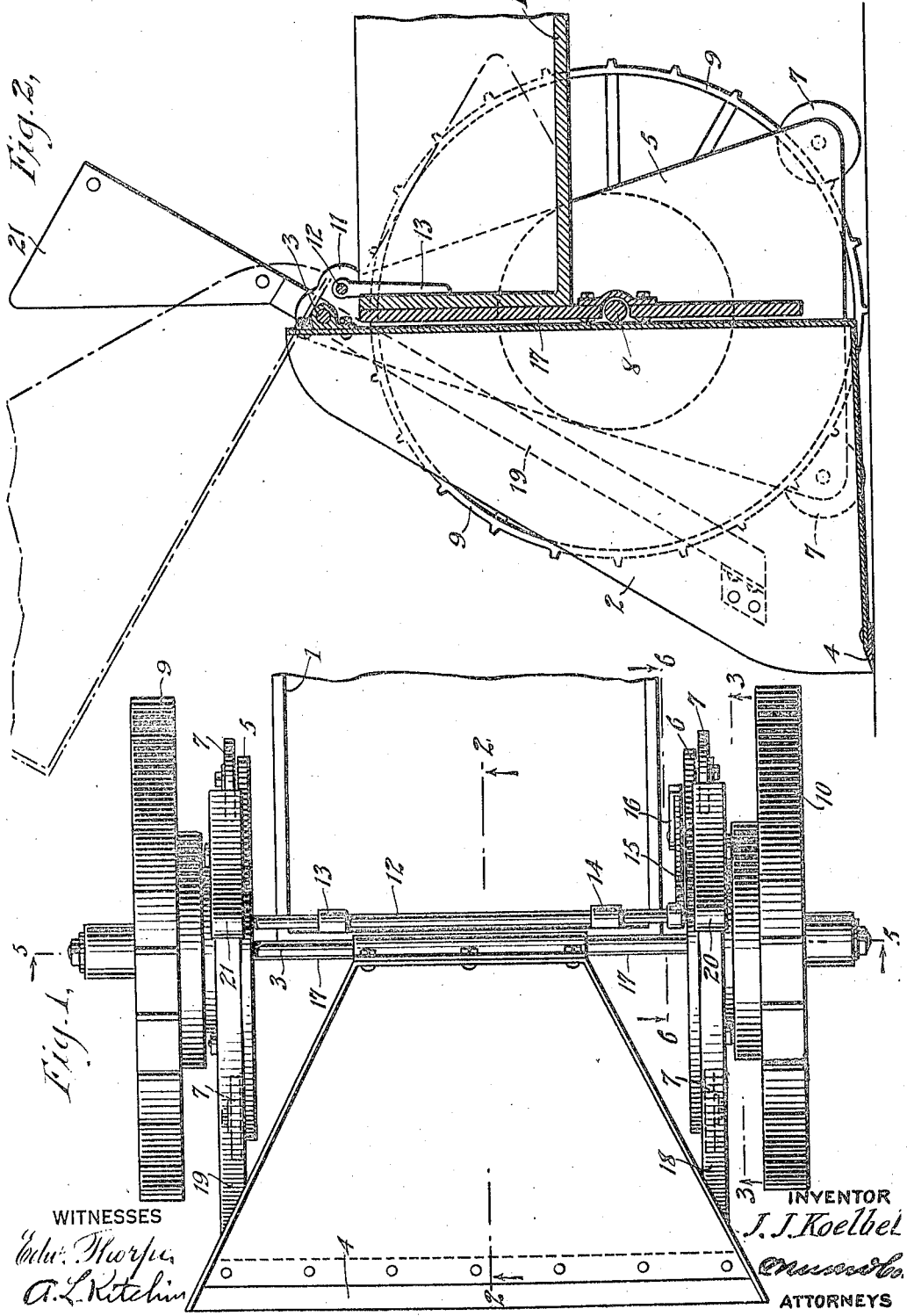
INVENTOR
J. J. Koelbel
ATTORNEYS Dec. 4, 1928.  J. J. KOELBEL  1,694,344
LOADER
Filed Feb. 24, 1928   3 Sheets-Sheet 2
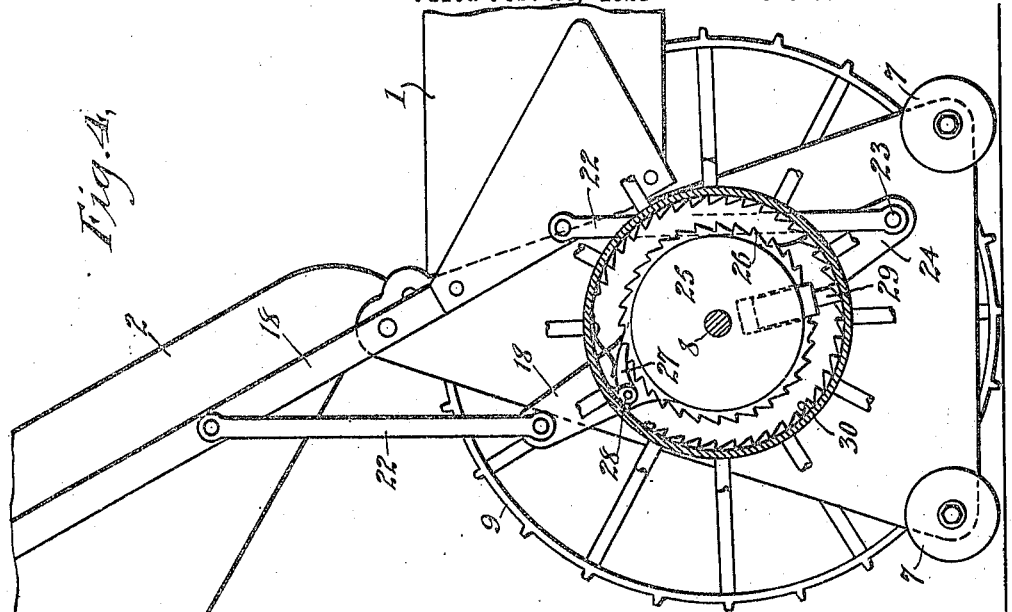
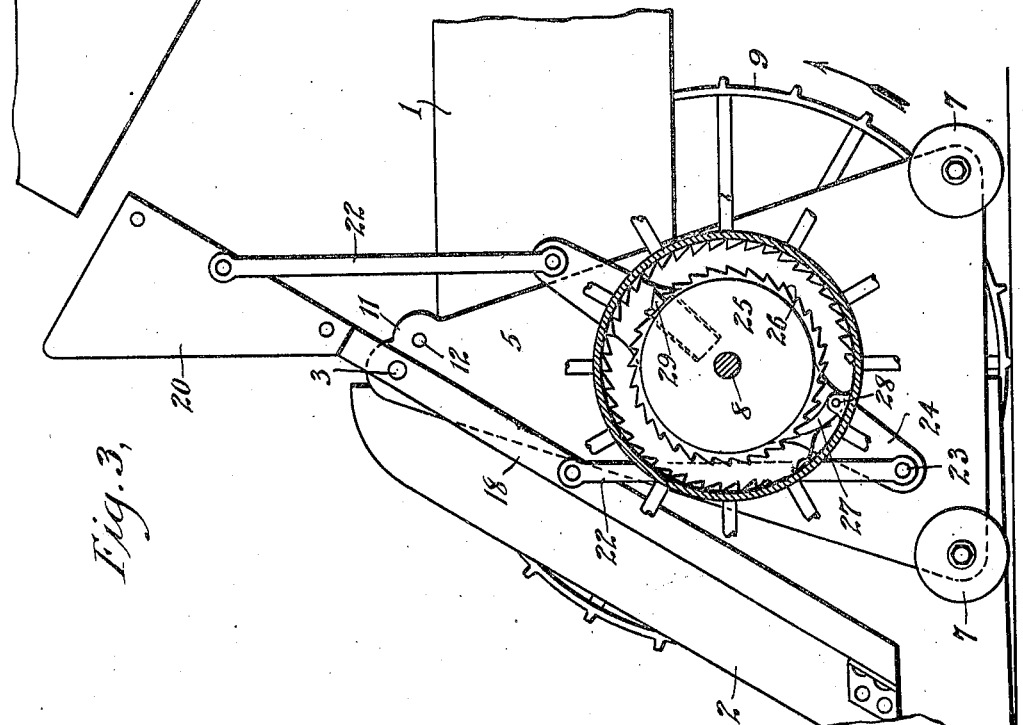
WITNESSES
Edw. Thorpe
A. L. Kitchin
INVENTOR
Jos. J. Koelbel
BY
Munn & Co.
ATTORNEY Dec. 4, 1928.
J. J. KOELBEL
LOADER
Filed Feb. 24, 1928
1,694,344
3 Sheets-Sheet 3
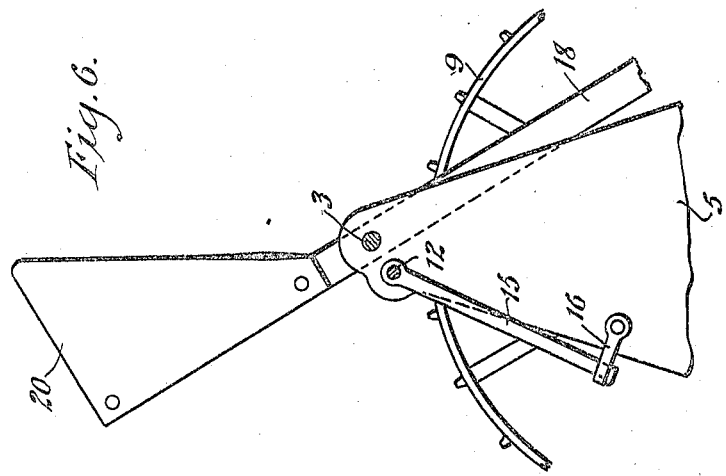
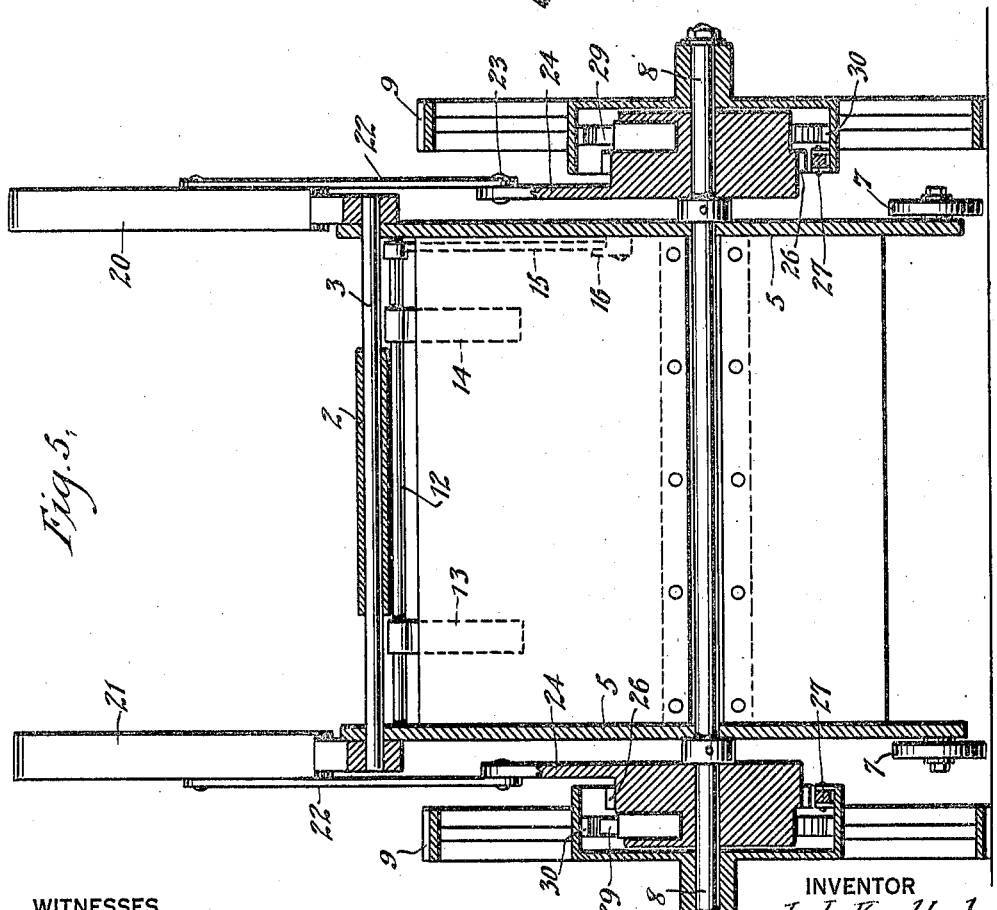
WITNESSES
INVENTOR
J. J. Koelbel
ATTORNEY Patented Dec. 4, 1928.

1,694,344

UNITED STATES PATENT OFFICE.

JOSEPH J. KOELBEL, OF BALDWIN, NEW YORK.

LOADER.

Application filed February 24, 1928. Serial No. 256,636.

This invention relates to loaders adapted to be removably connected to trucks or other vehicles, the object being to provide an improved construction which may be connected to a vehicle, load the same, and then be disconnected so as to be used with other vehicles.

Another object of the invention is to provide a loader which is adapted to be connected to a truck or other vehicle and be actuated thereby to function as a loading structure.

A further object, more specifically, is to provide a loader for trucks and the like which is adapted to be removably connected with a truck and which is also adapted to be actuated by the truck so that as the truck moves rearwardly, a lowering and loading of the loader is produced, and as the truck moves forwardly, an actuation of the loader is caused for dumping the material in the loader into the truck.

In the accompanying drawings—

Figure 1 is a top plan view of a loader disclosing an embodiment of the invention, the same being shown in connection with part of a truck.

Figure 2 is a sectional view through Figure 1, approximately on line 2—2.

Figure 3 is a sectional view through Figure 1, approximately on line 3—3.

Figure 4 is a view similar to Figure 3, but showing the parts in an elevated or dumping position.

Figure 5 is a transverse sectional view through Figure 1, approximately on line 5—5.

Figure 6 is a fragmentary sectional view through Figure 1 on line 6—6.

Referring to the accompanying drawings by numerals, 1 indicates the body of a truck, cart or other vehicle. The device may be associated with an automobile truck, a horse drawn vehicle, or in fact a vehicle of any kind, which is adapted to receive and carry loads of snow, earth, rubbish or the like. As indicated particularly in Figures 1 and 2, the loader is connected with the truck 1 and when this truck is moved rearwardly, the loader will scoop up snow or other matter until the scoop structure thereof is full. By a forward movement, the scoop structure will be moved to the position shown in Figure 4, whereupon the snow or other matter in the scoop structure will be dumped into the truck 1.

As indicated particularly in Figures 1 and 2, the scoop structure or scoop 2 is pivotally mounted on a rod 3. The scoop 2 may be of any desired structure and size, and is preferably provided with a comparatively strong and sharp edge 4. The device is primarily intended to scoop up and remove snow, though it could be used for many other purposes. As indicated in Figure 2, the edge plate 4 supports the scoop at one point, while shaft 3 supports it at a second point. The shaft 3 is mounted in side frames 5 and 6. Each of these frames carries front and rear rollers 7 which are normally held slightly above the ground, but when the frames are tilted slightly, one set of wheels will be on the ground and prevent the frames from rotating to any appreciable extent. A shaft 8 is provided, and if desired, may be rigidly secured to the traction wheels 9 and 10, which traction wheels are comparatively large and are provided with spurs or roughened peripheral members so as to grip the ground when the device is in use. Each of the frames is provided with an extension 11, which extensions are adapted to receive and support a rock shaft 12. This shaft carries a pair of clamping fingers 13 and 14 adapted to be clamped against the rear wall of the truck 1 as shown in Figure 2. An arm 15 is rigidly secured to shaft 12 as well as the fingers 13 and 14, said arm being capable of swinging the fingers 13 and 14 from a substantially horizontal position to a substantially vertical position. When in a vertical position as shown in Figure 2, the arm 15 is held as shown in Figure 6 by a suitable catch 16 whereby the loader is removably clamped to the truck 1. When the catch 16 is released and arm 15 swung upwardly until fingers 13 and 14 are substantially horizontal, the loader is released and the truck may move forwardly away from the same and a new truck substituted if desired. In order that the fingers 13 and 14 may function properly, a vertically disposed board 17 is secured to the frames 5 and 6 so that this board is clamped against the rear outside surface of the truck when the fingers 13 and 14 are pressing against the inner surface.

In order to counterbalance the scoop 2, and also to swing the same properly, beams 18 and 19 are secured to the scoop near the outer ends and are pivotally mounted as shown in Figure 5 on the shaft 3. Counterbalancing weights 20 and 21 are secured respectively to these beams on the opposite side of shaft 3 to the scoop. Preferably the scoop and associated parts are slightly heavier than the counterbalancing weights so that normally they cannot move downwardly from the position shown in Figure 4 to that shown in Figures 1 and 3. In order to elevate or swing upwardly the scoop 2, a link 22 is pivotally connected to each of the beams 18 and 19 and connected to certain mechanism hereinafter fully described which will cause the parts to be elevated as desired. As link 22 and associated parts on each side of the machine are identical, the description of one link and associated parts will apply to both.

As shown more particularly in Figures 3, 4 and 5, link 22 is pivotally connected at 23 to an arm 24, which arm is formed integral with or rigidly secured to a plate 25 rotatably mounted on shaft or axle 8. The plate 25 is provided with a ratchet wheel or ring 26 which co-acts with the spring pressed pawl 27 pivotally mounted on the casing 28 which is rigidly secured to the wheel 9 in any desired manner, as for instance, by being made integral therewith. By reason of this structure, whenever the truck 1 moves rearwardly it will rotate the wheel 9 in the direction of the arrow shown in Figure 3, and the scoop 2 will be forced into the snow or other material to be elevated. As the wheel 9 rotates, pawl 27 is merely pulled over the ratchet wheel 26 without producing any useful result. However, when the rearward motion stops and the truck 1 is moved forwardly, wheel 9 will rotate in a reverse direction to the arrow shown in Figure 3, whereupon pawl 27 will push against the ratchet wheel 26 and begin to rotate the plate 25. This will swing the arm 24 upwardly from the position shown in Figure 3 to that shown in Figure 4. This upward swinging movement of the arm 24 will cause link 22 to raise the scoop 2 and thereby dump the snow or other material into truck 1. The scoop may be raised to the position shown in Figure 4 or to a still higher position, or until the beam 18 strikes against shaft or axle 8. This will prevent any further swinging movement of the scoop, and if the truck should be moved forwardly still further, wheels 9 and 10 would merely scrape along on the ground without injuring any of the parts. When the truck is stopped and started rearwardly, the reciprocating pawl 29 engages the rack 30 formed integral with or rigidly secured to the casing 28. As the casing rotates in the direction of the arrow shown in Figure 3, it will start to move the pawl 29 in a circle and thereby rotate the plate 25 in which pawl 29 is slidingly mounted. This movement will cause the arm 18 to be positively swung downwardly whereby the scoop and associated parts are started on the downward movement, which movement may be completed by the action of the ratchet wheel 30 and associated parts, or by the weight of the scoop and associated parts. In any event, when the scoop strikes the ground, pawl 29 will slide radially inwardly under the action of gravity until it assumes substantially the position shown in Figure 3. This will allow the casing 28 to rotate freely in a reverse direction so that the scoop may be forced into the snow or other material being loaded. After a new load has been secured by the scoop, the truck is started forward again and moved forward a short distance or until the scoop has been again dumped. This back and forth movement of the truck provides the power for not only swinging the scoop from a lower to a higher position, but also provides power for forcing the scoop into the material to be loaded. After a desired load has been secured for truck 1, catch 16 is swung out of the way and arm 15 swung upwardly until the fingers 13 and 14 are above the truck 1. After this has been done, truck 1 may move forwardly away from the loader and a new truck may be backed up against the loader and the fingers 13 and 14 returned to their clamping position as shown in Figure 2. The new truck then may act in the same way as heretofore described in order to secure a load, and after having secured a load, may release the loader so that the third and succeeding trucks may secure loads. By utilizing the power of the trucks or other vehicles, the loader may be made very strong and simple, and yet efficiently operate to scoop up and dump snow and other material into trucks. The wide end of the scoop may be any width, as for instance, as wide as the truck, while the narrow end is appreciably narrower than the truck so that the batch of snow or other material may be scooped up and readily dumped into the truck without any appreciable spilling.

What I claim is:

1. A loader for trucks and the like, comprising a body, means for disengageably connecting the body with the body of a truck, a pair of traction wheels carried by the body, a scoop pivotally mounted on the body, a pair of arms connected with each of the traction wheels, a link pivotally connected with each of the arms and pivotally connected with the scoop, and means associated with the traction wheels and arms for causing the arms to function to swing the scoop upwardly and then downwardly as the truck moves the loader forwardly and rearwardly.

2. A loader for trucks and the like, including a swinging scoop, a manually actuated clamp adapted to clamp the scoop to the truck, means for pivotally mounting the scoop, counterbalancing weights operatively associated with the scoop, and means including a pair of traction wheels, a series of pawls and ratchets and links for swinging the scoop upwardly to a dumping position and then downwardly to a scooping position as the truck moves forwardly and rearwardly.

3. A loader for trucks and the like, comprising a frame including a substantially vertical wall, a rock shaft carried by said frame, a pair of clamping fingers rigidly secured to said rock shaft and adapted to pinch part of a truck against said wall when the loader is in an operative position, an arm for actuating said rock shaft and fingers, a catch for holding said arm in an operated position, a scoop carried by said frame, means for pivotally mounting the scoop on the frame, and means for actuating said scoop to swing the same upwardly to a dumping position and then downwardly to a scooping position.

4. A loader for trucks and the like, comprising a supporting frame, a pair of traction wheels carried by the frame, a scoop pivotally mounted on said frame, swinging members for moving said scoop upwardly to a dumping position and then downwardly to a scooping position, a plate rigidly connected with said swinging members, a ratchet ring carried by said plate, a pawl carried by one of said traction wheels and normally engaging said ratchet ring whereby when said traction wheel rotates in one direction power will be transmitted to said swinging members for swinging said scoop upwardly to a dumping position, a ratchet ring connected with one of said traction wheels, and a radially movable pawl carried by said plate adapted to move by gravity into engagement with said last mentioned ratchet ring whereby when said traction wheel moves in the opposite direction to its first movement said scoop will be lowered.

5. A loader for vehicles, including a scoop for raising and dumping material into the vehicle, means including a pair of arms and links for raising and lowering the scoop, a pair of traction wheels, an axle connected with said traction wheels, a drum connected with each of said traction wheels formed with an interior ratchet ring, a plate rotatably mounted on said axle within each of said gear rings, each of said plates having on the periphery teeth presenting a ratchet ring, a spring pressed pawl carried by each of said drums positioned to continually engage the second mentioned ratchet ring, each of said plates being connected to two of said arms for actuating the same, and a radially movable pawl carried by each of said plates, said pawls being adapted to move under gravity into engagement with the first mentioned ratchet ring when the scoop is in a raised position and to move away from said first mentioned ratchet ring when the scoop is in its lowermost position.

6. A loader for trucks and the like, comprising a scoop, a frame independent of the truck for supporting the scoop, a pair of traction wheels carried by the frame, means for pivotally mounting the scoop on a frame so that it may be swung upwardly and downwardly, means for disengageably clamping the frame to a truck, and means for causing said scoop to be raised and lowered as the truck moves the frame back and forth, said means being carried by the frame and operatively connected with the scoop, said last-mentioned means including arms connected with said traction wheels and links pivotally connected with said arms and with said scoop.

Signed at Baldwin in the county of Nassau and State of New York this 20th day of February A. D. 1928.

JOSEPH J. KOELBEL.